United States Patent
Herbst (10) Patent No.: US 10,268,903 B2
(45) Date of Patent: Apr. 23, 2019

(54) METHOD AND SYSTEM FOR AUTOMATIC CALIBRATION OF AN OPERATOR MONITOR

(71) Applicant: JUNGO CONNECTIVITY LTD., Netanya (IL)

(72) Inventor: Ophir Herbst, Herzliya (IL)

(73) Assignee: JUNGO CONNECTIVITY LTD., Netanya (IL)

( * ) Notice: Subject to any disclaimer, the term of this patent is extended or adjusted under 35 U.S.C. 154(b) by 83 days.

(21) Appl. No.: 15/619,490

(22) Filed: Jun. 11, 2017

(65) Prior Publication Data

US 2018/0357494 A1 Dec. 13, 2018

(51) Int. Cl.
*G06K 9/00* (2006.01)

(52) U.S. Cl.
CPC ..... *G06K 9/00791* (2013.01); *G06K 9/00845* (2013.01)

(58) Field of Classification Search
CPC ........... G06K 9/00335; G06K 9/00362; G06K 9/00597; G06K 9/00845; G06K 9/209; G06K 9/6202; G06K 9/6212; G06K 9/6256; G06K 9/78; G06K 9/00791
See application file for complete search history.

(56) References Cited

U.S. PATENT DOCUMENTS

| | | | | |
|---|---|---|---|---|
| 7,970,175 B2 * | 6/2011 | Malawey | ................. | A61B 5/18 180/272 |
| 8,022,831 B1 * | 9/2011 | Wood-Eyre | ............... | B60T 7/14 180/272 |
| 9,475,389 B1 * | 10/2016 | Fung | ...................... | B60K 35/00 |
| 9,616,809 B1 * | 4/2017 | Alasry | .................. | B60W 50/14 |
| 2002/0118893 A1 * | 8/2002 | Nguyen | ............. | G01N 21/9515 382/294 |
| 2004/0178890 A1 * | 9/2004 | Williams | ................. | B60Q 1/52 340/425.5 |
| 2006/0214807 A1 * | 9/2006 | Tengshe | ................. | G08B 21/06 340/576 |
| 2007/0008151 A1 * | 1/2007 | Victor | ...................... | A61B 5/11 340/573.1 |
| 2009/0192686 A1 * | 7/2009 | Niehsen | ................ | B60W 30/17 701/70 |
| 2011/0144859 A1 * | 6/2011 | Suk | ....................... | B60W 30/12 701/33.4 |
| 2011/0169625 A1 * | 7/2011 | James | .................... | B60Q 9/008 340/439 |
| 2013/0113923 A1 * | 5/2013 | Chien | ....................... | B60R 1/00 348/135 |
| 2013/0116856 A1 * | 5/2013 | Schadeck | ............... | B60K 28/06 701/1 |
| 2013/0162794 A1 * | 6/2013 | Wakiyama | ............... | A61B 5/18 348/77 |

(Continued)

*Primary Examiner* — Anner N Holder
(74) *Attorney, Agent, or Firm* — Alphapatent Associates, LTD; Daniel J. Swirsky (57) ABSTRACT

Systems and methods for automatic calibration of a monitor of a driver include receiving an indication that the driver is driving a car and determining a typical orientation of the driver in a first set of images, the first set captured after receiving the indication. An orientation of the driver in a second set of images, which is captured after the first set, is compared to the typical orientation and a command is generated based on the comparison.

18 Claims, 5 Drawing Sheets

(56) References Cited

U.S. PATENT DOCUMENTS

| | | | |
|---|---|---|---|
| 2013/0216108 A1* | 8/2013 | Hwang | G06K 9/00926 382/118 |
| 2014/0058587 A1* | 2/2014 | Leinfelder | G05D 1/0011 701/2 |
| 2014/0111647 A1* | 4/2014 | Atsmon | H04N 7/185 348/148 |
| 2014/0125474 A1* | 5/2014 | Gunaratne | G08G 1/163 340/439 |
| 2014/0272811 A1* | 9/2014 | Palan | G07C 5/008 434/66 |
| 2014/0309893 A1* | 10/2014 | Ricci | H04W 4/21 701/49 |
| 2015/0269735 A1* | 9/2015 | Tateno | G06K 9/4671 382/153 |
| 2016/0046298 A1* | 2/2016 | DeRuyck | B60W 40/09 340/576 |
| 2016/0304099 A1* | 10/2016 | Hatakeyama | A61B 5/1103 |
| 2017/0078901 A1* | 3/2017 | Iwanaga | G06T 7/11 |
| 2017/0158054 A1* | 6/2017 | Munaoka | B60W 30/09 |
| 2018/0075727 A1* | 3/2018 | Akiva | B60Q 9/00 |

* cited by examiner

METHOD AND SYSTEM FOR AUTOMATIC CALIBRATION OF AN OPERATOR MONITOR

FIELD OF THE INVENTION

The invention relates to the field of monitoring a human operator, such as a driver.

BACKGROUND

Human error has been cited as a primary cause or contributing factor in disasters and accidents in many and diverse industries and fields. For example, traffic accidents involving vehicles are often attributed to human error and are one of the leading causes of injury and death in many developed countries. Similarly, distraction (e.g., mental distraction) of a worker affects performance at work and is one of the causes of workplace accidents.

Therefore, monitoring human operators, such as workers or drivers of vehicles, is an important component of accident analysis and prevention.

Safety systems to monitor a driver's steering, acceleration, braking and use of other controls, have been introduced into vehicles by several car companies.

Some safety systems use an infrared camera positioned on the vehicle's steering column. In these systems a camera must be correctly positioned at specific, often pre-determined locations and orientations so as to capture an image of the monitored human that can be analyzed.

SUMMARY

Embodiments of the invention provide self-calibrating methods and systems for monitoring a person operating an apparatus based on images of the person and based on operation parameters of the apparatus. Embodiments of the invention do not require that the camera obtaining images of the monitored person be positioned at a specific pre-determined location and as such the systems and methods may be easily installed and used.

Systems and methods according to embodiments of the invention utilize an operator end imaging device, a sensor to sense and report operation parameters of an apparatus and software to enable calibration based on input from the imaging device and sensor and, after calibration, to enable monitoring the operator's state and identifying an operator's state that may lead to an event, in real time.

In one embodiment a system for automatic monitoring of a driver includes a processing unit to receive an indication that the driver is driving a car and to determine a typical orientation of at least part of the driver in a first set of images that are captured after receiving the indication. The processing unit then receives a second set of images (which is captured after the first set) and compares the orientation of the part of the driver in the second set of images to the typical orientation determined from the first set of images. The processing unit may generate a command based on the comparison, as further exemplified below.

The system may include a sensor to generate the indication that the driver is driving the car. Typically, the indication is generated based on operation parameters of the car. The sensor is typically associated with the car and is in communication with the processing unit.

The system may further include at least one camera to obtain the first and second sets of images and to provide the images to the processing unit.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide self-calibrating systems and methods for monitoring the state of a human user or operator of an apparatus, such as a driver of a vehicle or person operating a computer or other apparatus.

Once an indication is received that the operator is operating the apparatus, data from images of the operator is used as a reference by which to calibrate subsequent images of the operator. Using the calibrated images, embodiments of the invention enable monitoring a person and identifying safety, health or stress situations in real time.

Methods and systems for self-calibrated monitoring of a person operating an apparatus, according to embodiments of the invention, utilize information from images of the person and operation parameters of the apparatus. Information from images may include, for example, the position or direction of the operator's face relative to the camera obtaining the images.

In embodiments of the invention it is determined that an apparatus is being operated, based on measured operation parameters, and the position/orientation of the person operating the apparatus is then derived from images of the person.

A reference orientation of the operator of the apparatus, while operating the apparatus, can be determined from statistics derived from the images of the operator. The reference orientation can then be compared against subsequent images of the operator, in the same context (while still operating the same apparatus), to learn about the operator's state.

Operation parameters of the apparatus include characteristics typical of the apparatus. For example, operation parameters of a vehicle may include speed, acceleration, direction of movement, location, etc., whereas operation parameters of a human operated apparatus having a keyboard and display (e.g., personal computer) may include number of key strokes and/or mouse clicks, frequency of key strokes and/or mouse clicks, location of mouse click, etc.

The value of an operation parameter may indicate if the apparatus is being operated. For example, if a car is moving forward and at above a predetermined speed, that would indicate that the car is being operated, namely that a driver is driving the car.

The terms "driver" and "driving" used in this description refer to any person monitored according to embodiments of the invention. The terms "driver" and "driving" may refer to an operator or operating of a vehicle (e.g., car, train, boat, airplane, etc.) or equipment. Although the following examples mostly describe a driver of a vehicle, embodiments of the invention may also be practiced on human operators of machines other than vehicles, such as computers, home or industrial equipment and healthcare equipment.

A driver's (or other operator's) state refers mainly to the level of distraction of the driver. Distraction may be caused by external events such as noise or occurrences in or outside the vehicle (or space where the driver or operator is operating), and/or by the physiological or psychological condition of the driver, such as illness, drowsiness, fatigue, anxiety, sobriety, inattentive blindness, readiness to take control of the vehicle, etc. Thus, an operator's state may be an indication of the physiological and/or psychological condition of the operator.

An unsafe state of an operator (e.g., driver or other operator or person) refers to an operator's state leading to a possible event, such as a health risk event or an event that could be detrimental to the operation of a vehicle or other machine. For example, a distracted (e.g., drowsy or anxious) state of a driver is typically an unsafe state of the driver. In another example, a distracted or otherwise not normal state of a person (e.g., above normal eye blinks, etc.) may indicate an undesirable psychological event or an imminent health risk event such as a stroke or heart attack and is considered an unsafe state of the person being monitored.

In some embodiments, upon a sign of an unsafe state (e.g., distraction, stress or drowsiness of the operator), information about the operator's state (e.g., live streams of images of the operator) may be sent to one or more remote devices that are accessible to remote users such as call centers, employers, friends or family, who can monitor the operator substantially in real-time and call the operator and/or issue alarms to the operator and/or call for help if necessary. In other embodiments, upon detecting an unsafe state of the operator a command is generated which may include a warning signal or signal to control systems associated with the vehicle or other signals.

Figure 1:
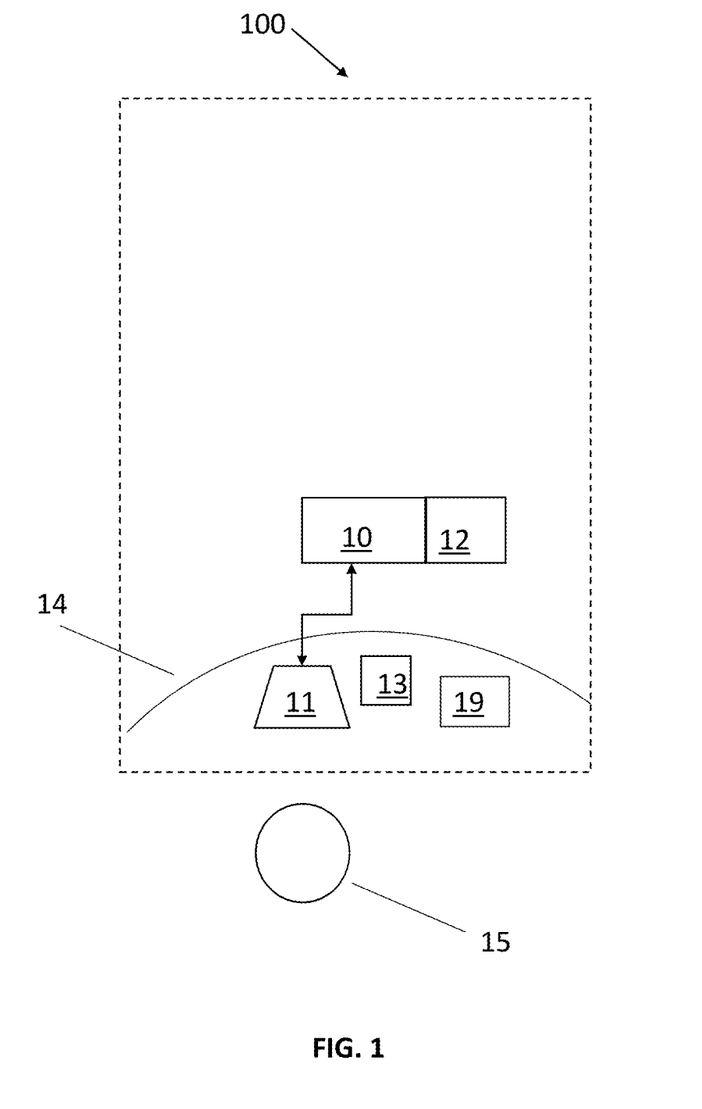
FIG. 1 is a schematic illustration of a system operable according to embodiments of the invention.

An example of a system operable according to embodiments of the invention is schematically illustrated in FIG. 1.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "determining," "detecting", "identifying", "extracting" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

System 100 or part of the system is typically installed on or in an apparatus being operated by a monitored operator. An apparatus may be a vehicle or other apparatus such as a computer, home or industrial equipment and healthcare equipment.

In some embodiments the system 100 includes an operator end device, e.g., a camera 11 located in a vehicle 14 to obtain image data of a driver 15 in the vehicle 14. Image data may include data such as values that represent the intensity of reflected light as well partial or full images or videos.

Typically, images obtained or captured by camera 11 include at least part of the driver 15. For example, the driver's head or face and/or the driver's eyes may be imaged by camera 11.

Camera 11 typically includes or is in communication with a processing unit 10 and a memory 12. In one embodiment processing unit 10 receives image data of at least part of the driver 15, e.g., the driver's head or face or part of the driver's head or face (e.g., the driver's eyes) and applies image processing algorithms on the image data to calibrate the system 100.

Processing unit 10 may run image processing algorithms to detect from the image data collected by camera 11 a part of the operator. In one example, face detection and/or eye detection algorithms (including computer vision, machine learning and deep learning processes) may be used to detect a driver's head and/or face and/or features of the face (such as eyes) in the images.

In some embodiments the system 100 includes or is in communication with one or more sensors to sense operation parameters of the apparatus. As described above, operation parameters of the apparatus include characteristics typical of the apparatus. For example, motion sensor 19 may sense motion and/or direction and/or acceleration and/or location (e.g., GPS information) and/or other relevant operation parameters of the vehicle 14 thereby providing indication that the driver 15 is operating (i.e., driving) the vehicle. Motion sensor 19 may include, for example, an accelerometer and/or GPS and/or speedometer and/or other suitable measuring devices. In other embodiments a sensor on a computer's keypad and/or mouse or touchpad may indicate when keys are being pressed or mouse is being clicked and where the cursor is located to indicate that a person is operating the computer.

Once processing unit 10 receives indication (e.g., from motion sensor 19) that the driver is driving, for example, if the vehicle is moving above a predetermined speed for above a predetermined time and in a predetermined direction, it is assumed that the driver's face and/or eyes (which may be detected in images obtained by camera 11 using known image analysis algorithms, e.g., as described above) are directed straight ahead most of the time. Thus, in some embodiments, when indication is received that the vehicle is in operation (e.g., that the driver is driving the vehicle), the processing unit 10 determines that the driver's head position or orientation with respect to the camera 11 is the position or orientation in which the driver is looking straight ahead and uses this head orientation to calibrate the camera 11 and other parts of the system, as further described below.

A person's position or orientation, as used herein, may include the coordinates of the person or part of the person and/or posture (e.g., pitch, yaw and roll) of the person or part of the person. For example, an orientation of a person may include the direction of the person's face or eyes relative to the camera.

Processing unit 10 receives a signal from sensor 19 indicating that the driver is driving and based on this signal processing unit 10 determines a typical orientation of the driver's head from image data captured at or after the signal from sensor 19 is received. Since it can be assumed that a driver is looking forward most of the time (e.g., 95% of the time) while he is driving, an average (or other statistically typical) position or orientation of the head can be assumed to be the orientation of the driver's head relative to the camera 11, while the driver is correctly operating the apparatus (e.g., looking forward at the road). For example, an average position of the driver's head in 10-20 images received after it has been determined that the driver is driving the vehicle, may be considered to be the typical orientation the driver's head relative to the camera, while driving.

The typical orientation may then be determined to be a reference orientation in comparison to which further image analysis may be performed. In one embodiment the reference orientation may be compared to the orientation of the driver's head in later captured images by processing unit 10 and based on the comparison a command may be generated. For example, a deviation (e.g., above a pre-determined threshold) of the driver's head orientation from the reference orientation in later captured images may mean the driver is not correctly operating the vehicle (e.g., is not looking forward at the road) and the command generated based on the detection of this deviation may be used to alert the driver, to take control of systems associated with the vehicle (e.g., brakes), etc.

Using the reference orientation determined from a first set of images may also facilitate detection of the driver's face and/or eyes and/or other parts of the driver and/or orientation of the driver in a second, later captured, set of images.

In some embodiments processing unit 10 may run image processing algorithms to detect from the image data collected by camera 11 an unsafe driver's state, for example from biometric parameter values extracted from images of the driver. Biometric parameters extracted from image data of the driver, typically by using computer vision techniques, include parameters indicative of the driver's state, such as, one or more eye gaze direction, pupil diameter, head rotation, blink frequency, blink length, mouth area size, mouth shape, percentage of eyelid closed (perclos), location of head, head movements and pose of the driver.

Tracking an operator's head or face, e.g., to detect head and/or eye movement, may be done by applying optical flow methods, histogram of gradients, deep neural networks or other appropriate detection and tracking methods.

Parameters such as direction of gaze or posture or position of a driver's head may be determined by applying appropriate algorithms (and/or combination of algorithms) on image data obtained from camera 11, such as motion detection algorithms, color detection algorithms, detection of landmarks, 3D alignment, gradient detection, support vector machine, color channel separation and calculations, frequency domain algorithms and shape detection algorithms.

In some embodiments processing unit 10 (or another processor) may be used to identify the driver in images obtained from the camera 11 and to associate the identified driver to a specific set of biometric parameter values.

Processing unit 10 may track a driver's head or face in a set of images obtained from camera 11 and extract biometric parameter values of the driver based on the tracking. In one embodiment biometric parameter values of a specific driver obtained from a first set of images are used to represent the baseline or normal state of the driver and may thus be used as a reference frame for biometric parameter values of that same driver obtained from a second, later, set of images.

The processing unit 10 may generate a command which includes an alert sign produced when an unsafe driver's state is detected from image data, for example, based on comparison of a current position of the driver with the reference position and/or based on the biometric parameter values calculated by processing unit 10.

The command generated by processing unit 10 may include an alarm to alert the driver and/or a signal to control a device or system associated with the vehicle such as a collision warning/avoiding system and/or infotainment system associated with the vehicle 14. In another embodiment the command may be used to send a notification to an external control center.

One or more cameras 11 may be positioned on a vehicle windshield, on the sun visor of the vehicle, on the dashboard, on the A-pillar, in the instruments cluster, on the front mirror of the vehicle, on a steering wheel of a vehicle or front window of a vehicle such as a car, aircraft, ship, etc. In one embodiment the camera 11 may be located at any location in the vehicle 14 (or other apparatus) so long as part of the driver that is to be monitored (e. g., the driver's head or eyes) are within the field of view (FOV) of the camera 11.

The camera 11 can be part of a standalone dedicated device, or part of multi-use device (such as mobile phone or tablet). The camera 11 may be preinstalled in the vehicle 14, or may be placed randomly by the driver or other person in any location in the vehicle 14 in which the monitored part of the driver is within the FOV of the camera 11. Similarly, a camera 11 may be placed at any location in a home, workplace or other environment to enable obtaining image data including a monitored part of a person.

Camera 11 typically includes a CCD or CMOS or other appropriate chip. The camera 11 may include a 2D or 3D camera. For example, camera 11 may be a standard camera provided with mobile devices such as smart phones or tablets. Thus, a mobile device such as a phone may be used to implement embodiments of the invention.

In one embodiment camera 11 obtains images at a high frame rate (e.g., 30 frames per second or higher) to achieve real-time imaging.

In some embodiments the system 100 includes one or more illumination sources 13 such as an infra-red (IR) illumination source, to facilitate imaging (e.g., to enable obtaining image data of the driver even in low lighting conditions, e.g., at night).

Some or all of the image data collected by the camera 11 may be stored locally on appropriate media in system 100 and processes according to embodiments of the invention, may occur locally, e.g., at processing unit 10.

In some embodiments, the image data and other information is stored on cloud storage. Additionally, processes according to embodiments of the invention, may occur in the cloud. For example, determining a typical orientation of a driver's head from a sequence of images of the driver, may be done onboard the vehicle or at a remote location, e.g., on the cloud.

Communication between components of the system 100 and/or external components may be through wired or wireless connection. For example, the system 100 may include an internet connection.

Processing unit 10 may include, for example, one or more processors and may be a central processing unit (CPU), a digital signal processor (DSP), a Graphical Processing Unit (GPU), a microprocessor, a controller, a chip, a microchip, an integrated circuit (IC), or any other suitable multi-purpose or specific processor or controller.

In some embodiments processing unit 10 is a dedicated unit. In other embodiments processing unit 10 may be part of an already existing vehicle processor, e.g., the processing unit 10 may be one core of a multi-core CPU already existing in the vehicle, such as in the vehicle IVI (In-Vehicle Infotainment) system, telematics box of the vehicle, domain controller or another processor associated with the vehicle.

According to some embodiments image data may be stored in memory 12. Memory 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Processing unit 10 can apply on the image data image analysis algorithms, such as known motion detection and shape detection algorithms and/or machine learning processes in combination with methods according to embodiments of the invention to analyze the image data, e.g., to detect an operator or part of an operator and to calculate a typical position of the operator (e.g., a typical position of the operator's head or eyes).

All or some of the units of system 100, such as camera 11 and/or motion sensor 19 may be part of a standard multi-purpose computer or mobile device such as a smart phone or tablet.

Figure 2:
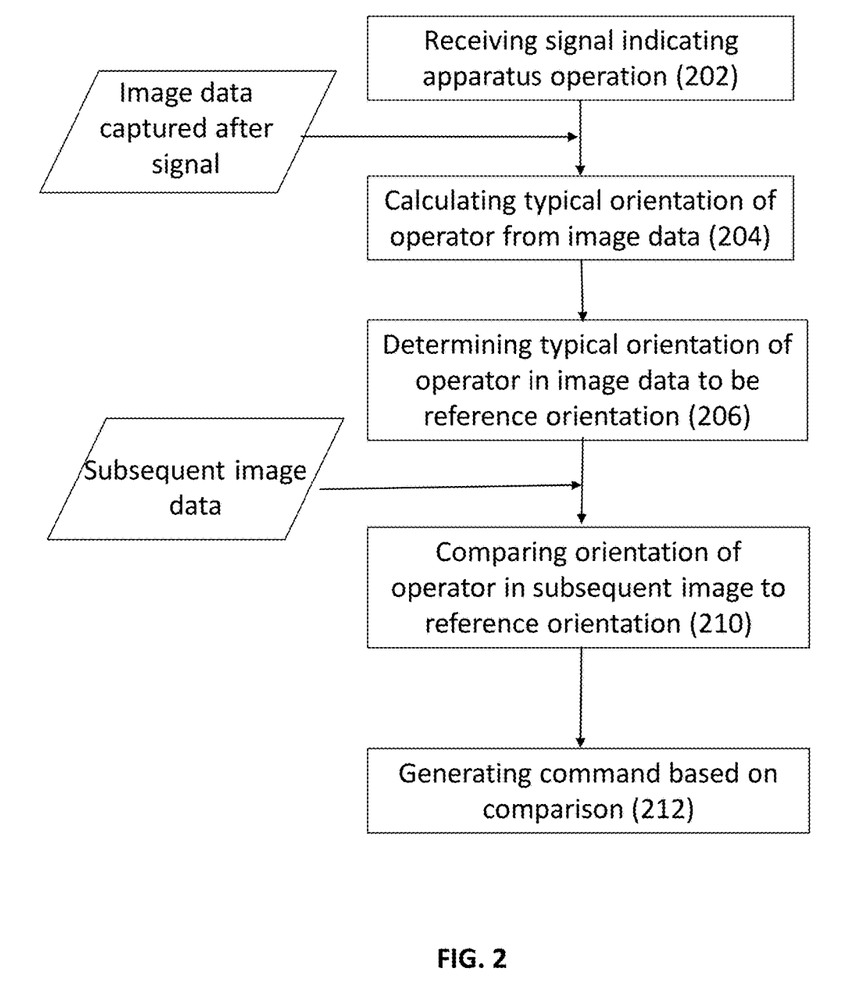
FIG. 2 is a schematic illustration of a method for automatic calibration of a monitor, according to an embodiment of the invention.

In one embodiment, which is schematically illustrated in FIG. 2, a method for automatic calibration of a monitor includes receiving (e.g., at processing unit 10) image data of at least part of the person (e.g., the person's head or eyes). The image data may include, for example, a set of successive images.

Once a signal indicating that the person is operating the apparatus, based on sensed operation parameters, is received (202), a typical orientation of the person while operating the apparatus is calculated from image data (which includes the person or part of the person) captured after receiving the signal (204). A typical orientation may be calculated from a subset of the image data, e.g., from a sub-set including 10-20 images out of the set of successive images.

A reference orientation is then determined based on the typical orientation of the person while operating the apparatus (206). For example, an average position or other calculation of a statistically typical position of a person calculated from 10-20 successive images obtained after the signal is received (e.g., when a vehicle is determined to be moving forward and fast), may be used to determine a reference orientation.

Since it can be assumed that an operator of an apparatus stays at the correct operating position or orientation most of the operating time, a typical orientation of the operator can be assumed to be the correct orientation of the operator while operating the apparatus. For example, a driver of a vehicle or a person working at a desktop computer may typically look forward 95% of the time while he is driving, or looking at a display and/or cursor position when working on the desktop computer and clicking on the mouse. Thus, the reference orientation represents the position or orientation of the operator (or part of the operator) when correctly operating the apparatus.

Image data received after a reference orientation is determined is termed subsequent image data or later captured image data. For example, subsequent image data may include an image captured, in a time sequence, after the set of images from which the typical orientation was calculated.

Once subsequent image data is received, an orientation of the person in the subsequent image data is compared to the reference orientation (210) and a command is generated based on the comparison (212).

In one embodiment the operator is a driver and the apparatus is a vehicle. The command generated (optionally by processing unit 10) based on comparison of an orientation of the driver's head in subsequent image data to the reference orientation may include one or a combination of signals such as a signal to generate an alarm to warn the driver of his unsafe state and/or a signal used to control another device. For example, if a deviation of the driver's head orientation from the reference orientation is determined, an alarm to alert the driver may be generated and/or a signal may be generated to control a system associated with the vehicle such as a collision warning/avoiding system and/or infotainment system associated with the vehicle. In another embodiment the signal may be used to send a notification to an external control center.

In some embodiments biometrics of the operator are determined from the subsequent image data. An unsafe state of the operator may be determined based on the biometrics as well as based on the comparison between the operator's orientation in the subsequent image data to the reference orientation. Thus, a command may be generated (212) based on the comparison and based on the determined biometrics.

In some embodiments the reference orientation is used to detect the orientation of the at least part of the operator in the subsequent image data. For example, a reference orientation is determined (based on a typical orientation) from a first set of images. In a second, subsequent, set of images the part of the operator (e.g., head, face, eyes, etc.) may be searched in a limited area of the subsequent images, according to the area where the part of the operator was in the first set of images. Additionally, a direction or position of the operator or part of the operator may be searched for in the subsequent set of images according to the reference orientation.

In some embodiments the reference orientation is used to determine the biometrics of the operator. For example, the location of an operator's head or face can be determined from the reference orientation, thereby facilitating tracking the head and/or determining biometrics from the face of the operator, as described above.

Figure 3:
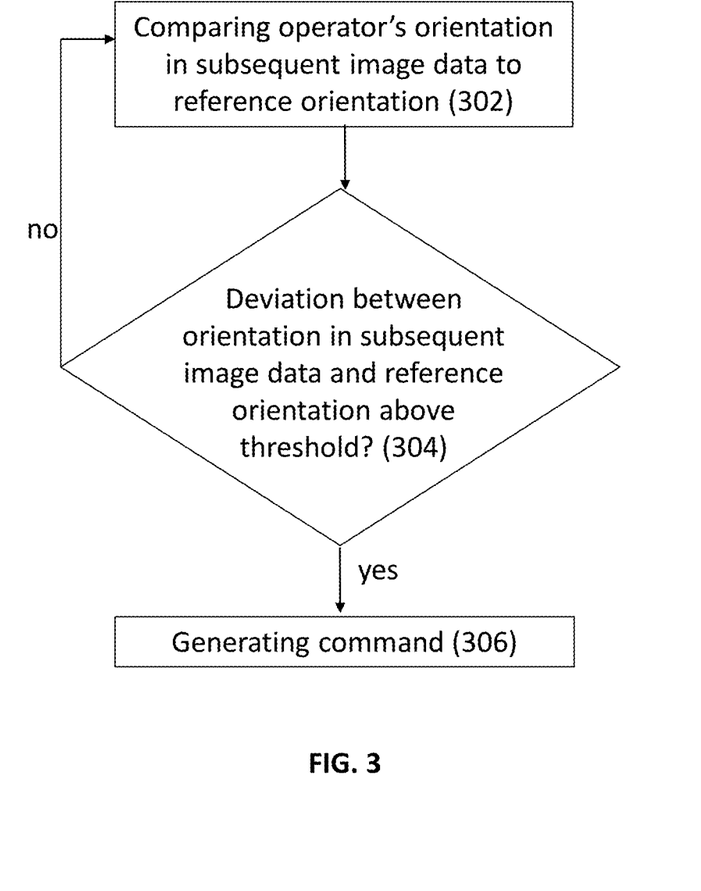
FIG. 3 is a schematic illustration of a method for automatic calibration of a monitor, according to another embodiment of the invention.

In one embodiment, which is schematically illustrated in FIG. 3, if the comparison shows that the person's orientation in the subsequent image data deviates from the reference orientation, a command may be generated (e.g., by processing unit 10) based on the comparison.

In this example, an operator's (e.g., driver's) orientation in subsequent image data is compared to the reference orientation (302). If the operator's orientation in the subsequent image data deviates from the reference orientation by more than a predetermined threshold (304) then a command is generated (306). If the deviation is smaller than the predetermined threshold (304) then the command is not generated and additional subsequent image data is compared to the reference position.

As described above, a reference orientation is determined after a signal which is based on operation parameters of the apparatus, is received, indicating that the person is operating the apparatus or that the apparatus is in operation.

A signal indicating that the apparatus is in operation may be generated by an operator controlled device that may be in communication with processing unit 10 and upon input from the operator may send a signal indicating that the apparatus is in operation. In another embodiment the signal indicating that the apparatus is in operation may be generated by processing unit 10 based on a signal from one or more sensors of operation parameters of the apparatus, such as motion sensor 19.

Figure 4:
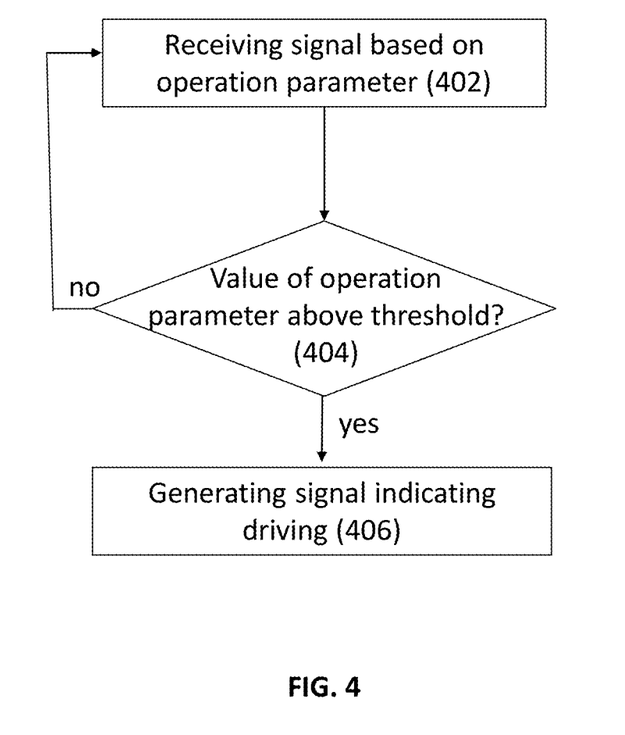
FIG. 4 schematically illustrates a method for generating a signal based on operation parameters, according to an embodiment of the invention.

In one embodiment which is schematically illustrated in FIG. 4, a signal based on one or more operation parameter (e.g., speed and/or acceleration and/or direction of a vehicle and/or locations of the vehicle, e.g., as determined by GPS information) is received from a sensor associated with a vehicle (402). If the value of the one or more parameters (the value of any of the parameters alone or a combined value of several parameters) is above a predetermined threshold (404) then a signal indicating operation of the apparatus (e.g., driving) is generated (406). If the value(s) is below the predetermined threshold (404) another signal based on operation parameters is awaited.

Operation of a vehicle may be measured by parameters such as speed, direction, acceleration and duration. In one example, if movement of a vehicle is above a certain velocity for a certain amount of time and/or movement is in a predetermined direction (e.g., forward) for a certain amount of time then a signal indicating driving is generated, after which image data of the driver may be presumed to include a position or orientation of the driver correctly operating the vehicle. Thus, a typical orientation of the driver as deduced from image data captured after receiving the signal indicating driving, may be determined to be a reference orientation for a driver correctly operating the vehicle.

Similarly, a sensor associated with a computer or other human operated device may sense key strokes or mouse clicks or other indications that a person is using the device. A signal indicating that the device is being operated may be generated if the number of key strokes and/or frequency of key strokes is above a predetermined threshold. In another example, a signal indicating that the device is being operated may be generated if the number of key strokes and/or frequency of key strokes is above a predetermined threshold and the location of a cursor is within a predefined range (e.g., in a central location of a computer display).

The step of determining whether the value of the one or more parameters is above a predetermined threshold (404) may be performed at the sensor 19 or by processing unit 10 or by another processor.

In some embodiments the reference orientation is updated based on the orientation of the operator (or part of the operator) in subsequent image data. The reference orientation may be continually updated.

Figure 5:
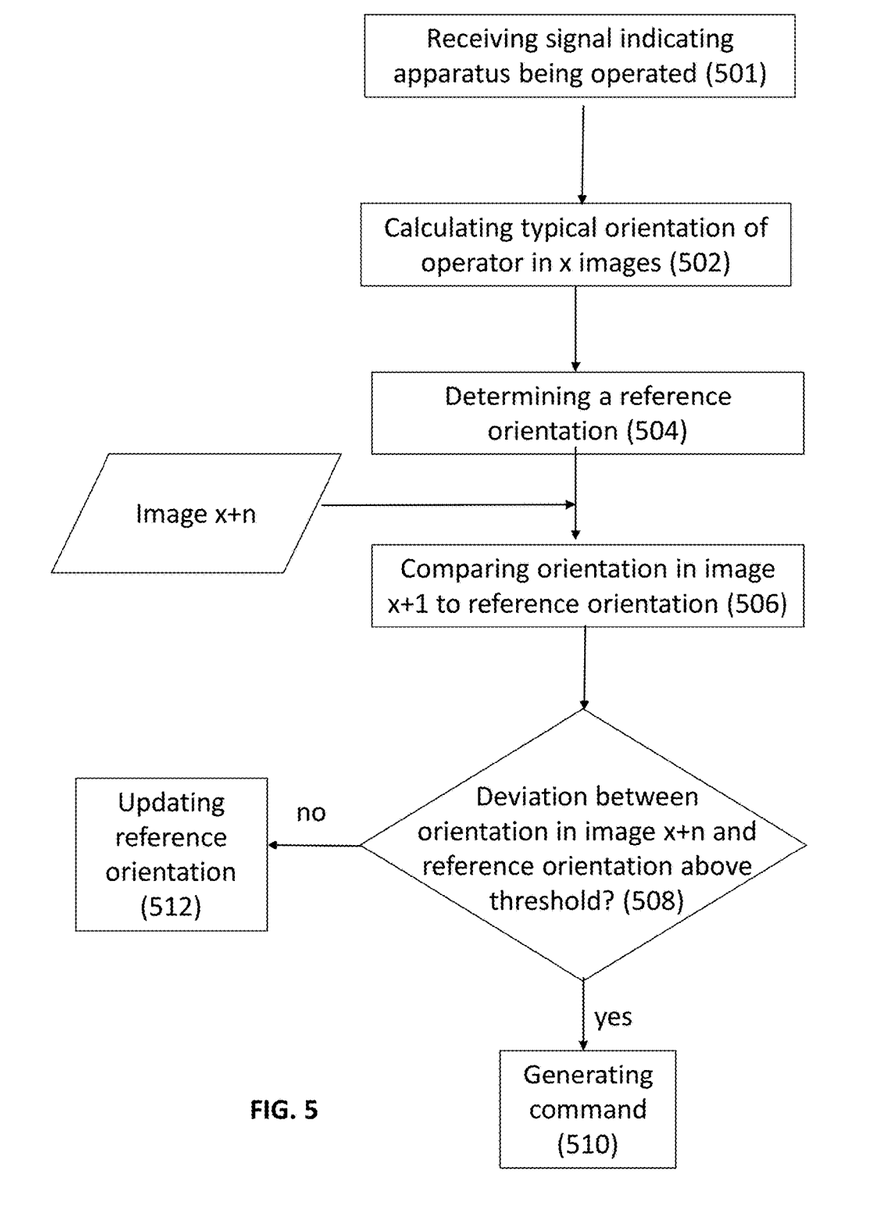
FIG. 5 is a schematic illustration of a method for updating a reference orientation, according to an embodiment of the invention.

As schematically illustrated in FIG. 5, after receiving a signal (based on operation parameters) that the apparatus is being operated (501), a typical orientation is calculated from a set of x images in a certain context (e.g., while a vehicle is moving forward at a speed above 30 kmph) (502) and a reference orientation is determined based on the typical orientation (504). A subsequent or later captured image, e.g., image x+n (wherein n is an integer greater than zero), is obtained and the orientation of the operator in image x+n is compared to the reference orientation (506). If the operator's orientation in image x+n deviates from the reference orientation by more than a predetermined threshold (508) then a command is generated (510). If the deviation is smaller than the predetermined threshold (508) then the command is not generated and the reference orientation is updated based on the orientation of the operator in image x+n (512).

Thus, in one embodiment, if the orientation of the operator (or part of the operator) in subsequent image data deviates from the reference orientation by less than a predetermined threshold then the reference orientation is updated and if the orientation of the operator (or part of the operator) in subsequent image data deviates from the reference orientation by more than the predetermined threshold then the reference orientation is not updated.

In another embodiment, if the operation parameters (one or more) are above a predetermined threshold then the reference orientation is updated and if the operation parameters are below the predetermined threshold then the reference orientation is not updated.

Consequently, the reference orientation is typically updated only while the apparatus is being correctly operated, namely, while the operation parameter values are above a predetermined threshold and while the deviation from the reference value is below a predetermined threshold.

For example, if a driver's orientation (e.g., the direction of the driver's gaze or the position (yaw, roll, pitch) of the driver's head) is more than 30 degrees to the right or left from the reference orientation or more than 20 degrees up or down compared with the reference orientation, while the vehicle is moving forward at above a predetermined speed, the driver is assumed to be distracted and not looking at the road and a command (e.g., to sound an alarm and/or to take control of vehicle systems) will be generated.

Embodiments of the invention enable self-calibration of a system to monitor operators of apparatuses, which enables easy and economical implementation of monitoring devices to advantageously monitor operators of possibly dangerous apparatuses.

The operator end imaging device according to embodiments of the invention is self-calibrating and may thus be easily implemented in a desired environment. Additionally, embodiments of the invention enable the use of multipurpose devices for monitoring an operator, providing an economical solution to monitoring drivers and other operators.

What is claimed is:

1. A method for automatic monitoring of an operator of an apparatus, the method comprising:
   receiving a signal based on an operation parameter of the apparatus, the signal indicating that the operator is operating the apparatus;
   receiving image data captured after receiving the signal, the image data comprising at least part of the operator;
   determining a typical orientation of the part of the operator in the image data, to be a reference orientation;
   comparing an orientation of the part of the operator in subsequent image data to the reference orientation;
   generating a command based on the comparison; and
   updating the reference orientation based on the orientation of the part of the operator in the subsequent image data, if the orientation of the part of the operator in the subsequent image data deviates by less than a predetermined threshold from the reference orientation; and
   not updating the reference orientation if the orientation of the part of the operator in subsequent image data deviates by more than a predetermined threshold from the reference orientation.

2. The method of claim 1 wherein the operator is a driver and the apparatus is a vehicle.

3. The method of claim 2 wherein the operation parameter of the apparatus comprises one or more of: speed, direction, acceleration and GPS information.

4. The method of claim 2 comprising receiving the signal if a value of at least one operation parameter is above a predetermined threshold.

5. The method of claim 2 comprising receiving the signal from a sensor associated with the vehicle.

6. The method of claim 1 wherein the part of the operator comprises the operator's head.

7. The method of claim 1 wherein the typical orientation of the part of the operator comprises an average orientation of the part of the operator.

8. The method of claim 1 comprising generating the command if the orientation of the part of the operator in subsequent image data deviates by more than a predetermined threshold from the reference orientation.

9. The method of claim 2 wherein the command comprises one or a combination of: a signal to generate an alarm, a signal to control a system associated with the vehicle and a signal to send a notification to an external control center.

10. The method of claim 1 comprising using the reference orientation to detect the orientation of the part of the operator in the subsequent image data.

11. The method of claim 1 comprising:
    determining biometrics of the operator from the subsequent image data; and
    generating the command based on the comparison and on the biometrics.

12. The method of claim 11 comprising using the reference orientation to determine biometrics of the operator.

13. The method of claim 1 comprising:
    if the operation parameter is above a predetermined threshold then updating the reference orientation; and
    not updating the reference orientation if the operation parameter is below the predetermined threshold.

14. A system for automatic monitoring of a driver, the system comprising:
    a processing unit configured to
    receive an indication that the driver is driving a car,
    determine a typical orientation of at least part of the driver in a first set of images, the first set captured after receiving the indication,
    receive a second set of images, the second set captured after the first set,
    compare an orientation of the part of the driver in the second set of images to the typical orientation,
    generate a command based on the comparison,
    update the typical orientation based on the orientation of the part of the operator in the second set, if the orientation of the part of the operator in the second set deviates by less than a predetermined threshold from the typical orientation, and
    not update the reference orientation if the orientation of the part of the operator in subsequent image data deviates by more than a predetermined threshold from the reference orientation.

15. The system of claim 14 comprising a sensor associated with the car and in communication with the processing unit, the sensor to generate the indication that the driver is driving the car.

16. The system of claim 14 comprising at least one camera in communication with the processing unit, the at least one camera to obtain the first and second sets of images.

17. The system of claim 16 wherein the camera is part of a multi-purpose mobile device.

18. The system of claim 14 wherein the processing unit is part of an already existing processor of the car.

* * * * *